United States Patent
Heggelund et al.

(10) Patent No.: US 9,519,982 B2
(45) Date of Patent: Dec. 13, 2016

(54) RASTERISATION IN GRAPHICS PROCESSING SYSTEMS

(71) Applicant: ARM Limited, Cambridge (GB)

(72) Inventors: Frode Heggelund, Trondheim (NO); Jorn Nystad, Trondheim (NO)

(73) Assignee: ARM LIMITED, Cambridge (GB)

( * ) Notice: Subject to any disclaimer, the term of this patent is extended or adjusted under 35 U.S.C. 154(b) by 709 days.

(21) Appl. No.: 13/907,559

(22) Filed: May 31, 2013

(65) Prior Publication Data

US 2014/0354670 A1    Dec. 4, 2014

(51) Int. Cl.
*G06T 11/40*        (2006.01)
(52) U.S. Cl.
CPC ................... *G06T 11/40* (2013.01)
(58) Field of Classification Search
None
See application file for complete search history.

(56) References Cited

U.S. PATENT DOCUMENTS

| | | | | |
|---|---|---|---|---|
| 6,259,452 B1 * | 7/2001 | Coorg | ................ | G06T 15/405 345/420 |
| 7,119,809 B1 * | 10/2006 | McCabe | ................ | G06T 11/40 345/422 |
| 2013/0342547 A1 * | 12/2013 | Lum | ................ | G06T 15/005 345/505 |

OTHER PUBLICATIONS

Digital Differential Analyzer (graphics algorithm), Jan. 10, 2013, Available at: http://en.wikipedia.org/wiki/Digital_differential_Analyzer_(graphics_algorithm), 2 pages.
Greene, Hierarchical Polygon Tiling with Coverage Masks, 1996, 12 pages.
Warnock, A Hidden Surface Algorithm for Computer Generated Halftone Pictures, Jun. 1969, 35 pages, National Technical Information Service, U.S. Department of Commerce.
Combined Search and Examination Report dated Dec. 9, 2014 in GB Patent Application No. GB1409584.8, 4 pages.
Examination Report dated Mar. 2, 2016 in GB Patent Application No. GB1409584.8.

* cited by examiner

*Primary Examiner* — Kee M Tung
*Assistant Examiner* — Nicholas R Wilson
(74) *Attorney, Agent, or Firm* — Vierra Magen Marcus LLP

(57) ABSTRACT

A rasterizer and a method of performing rasterization in a graphics processing pipeline are disclosed. A rasterizer of a graphics processing pipeline tests larger patches of a render output to be generated against a primitive to be rasterized, to determine if the primitive covers (at least in part) any smaller patches of the render output that the larger patch encompasses. The larger patch is then sub-divided into any covered smaller patches, and the process repeated. The rasterizer also identifies when a given smaller patch of the render output is found to entirely pass the edge test for an edge of the primitive in question when the larger patch encompassing that smaller patch is tested, notes that event in state information associated with the primitive edge in question, and then uses that state information to skip the testing of the edge in question against the smaller patch of the render output.

19 Claims, 4 Drawing Sheets

RASTERISATION IN GRAPHICS PROCESSING SYSTEMS

BACKGROUND

The technology described herein relates to the processing of computer graphics, and in particular rasterisation in graphics processing.

As is known in the art, graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates), e.g. for display.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed).

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

The rasterisation process basically maps the primitives defining the render output to be generated to the array of sampling points that will be used to render the output. This is typically done by determining, for each sampling point of the render output, whether the sampling point is covered by the primitive in question or not. This determination is typically done by testing the sampling points' positions against the edges of the primitive, to see if the sampling points are covered by the primitive. To do this, graphics processing systems typically derive (line) equations representing each of the edges of a primitive (e.g. using the defined vertices of the primitive), and then test the sampling points' positions using these edge equations. If a sampling point "passes" the edge test, it is taken to be within the primitive. A positive value for the edge equation is usually taken to indicate that the sampling point is inside the edge in question (that the edge test is "passed"), a negative value for the edge equation is usually taken to indicate that the sampling point is outside the edge in question (that the edge test is "failed"), and a value of "0" may be taken to indicate that the sampling point is inside or outside the edge in question (that the edge test is passed or not), depending on the "tie-break" rule being used.

The rasterisation process is typically carried out by testing sets of one, or of more than one, sampling point. For each set of sampling points found to include a sample point that is covered by the primitive in question (being tested), a discrete graphical entity usually referred to as a "fragment" on which the graphics processing operations (such as rendering) are to be carried out is then generated by the rasteriser and sent to the rest of the graphics processing pipeline (such as the renderer) for processing.

Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

The Applicants believe that there remains scope for improved techniques for rasterisation in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
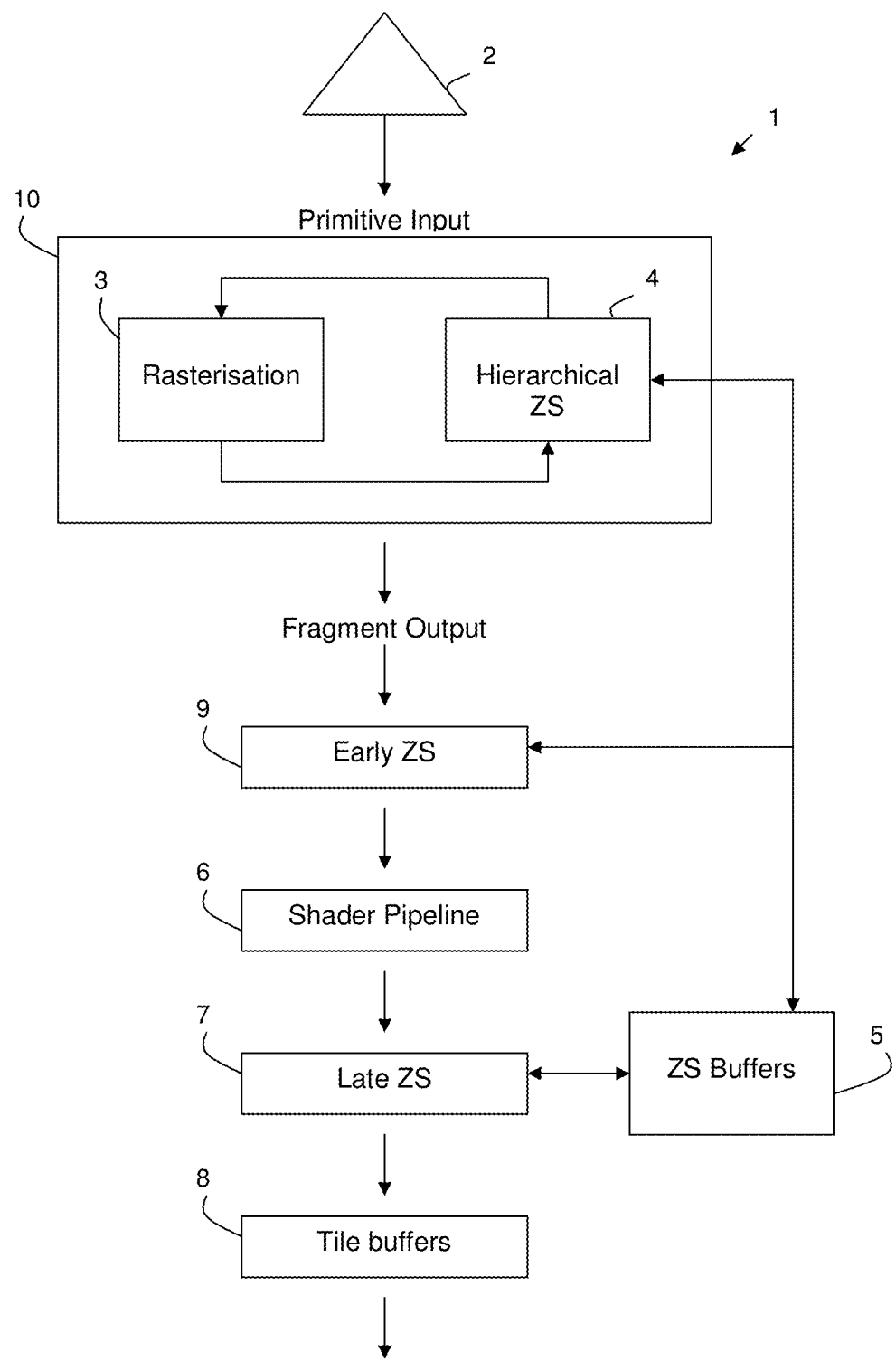
FIG. 1 shows schematically an embodiment of a graphics processing system that can operate in accordance with the technology described herein.

A first embodiment of the technology described herein comprises a method of performing rasterisation in a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data, the method comprising:

the rasteriser, when it receives a primitive to be rasterised, for each of one or more first-level patches representing respective different regions of a render output to be generated:

testing the patch against the edges of the primitive to determine if the primitive at least partially covers any patch of a set of plural smaller second-level patches of the render output that the first-level patch of the render output encompasses;

and if the primitive does at least partially cover any smaller second-level patch of the set of plural smaller second-level patches of the render output that the first-level patch of the render output encompasses, subdividing the first-level, larger, patch of the render output into the set of smaller second-level patches that the first-level larger patch of the render output encompasses, and for each second-level smaller patch of the render output that the primitive does at least partially cover, testing that second-level smaller patch of the render output against the edges of the primitive to determine if the primitive at least partially covers any patch of a set of plural smaller third-level patches of the render output that the second-level smaller patch of the render output encompasses; the method further comprising the rasteriser:

generating one or more graphics fragments for rendering for patches of the render output found to be covered at least in part by the primitive, each graphics fragment having one or more sampling points of the render output associated with it; and issuing the graphics fragments to the remainder of the graphics processing pipeline for processing;

and the method further comprising:

if a smaller patch of the render output in the set of smaller patches of the render output encompassed by a larger patch of the render output that the larger patch of the render output is to be sub-divided into is found when the larger patch of the render output is tested to entirely pass the edge test for an edge of the primitive, noting that event in state information associated with the primitive edge in question, and using that state information when testing the smaller patch of the render output that was found when tested to entirely pass the edge test for the edge of primitive against the primitive to skip the testing of the edge in question against the smaller patch of the render output.

A second embodiment of the technology described herein comprises a graphics processing pipeline comprising:

a plurality of processing stages, including a rasteriser that rasterises input primitives to generate graphics fragments to be processed, each graphics fragment having one or more sampling points associated with it, and a renderer that processes fragments generated by the rasteriser to generate output fragment data;

and wherein the rasteriser is configured to, when it receives a primitive to be rasterised, for each of one or more first-level patches representing respective different regions of a render output to be generated:

test the patch against the edges of the primitive to determine if the primitive at least partially covers any patch of a set of plural smaller second-level patches of the render output that the first-level patch of the render output encompasses;

and if the primitive does at least partially cover any smaller second-level patch of the set of plural smaller second-level patches of the render output that the first-level patch of the render output encompasses, subdivide the first-level, larger, patch of the render output into the set of smaller second-level patches that the first-level larger patch of the render output encompasses, and for each second-level smaller patch of the render output that the primitive does at least partially cover, test that second-level smaller patch of the render output against the edges of the primitive to determine if the primitive at least partially covers any patch of a set of plural smaller third-level patches of the render output that the second-level smaller patch of the render output encompasses;

and wherein the rasteriser is further configured to:

generate one or more graphics fragments for rendering for patches of the render output found to be covered at least in part by the primitive, each graphics fragment having one or more sampling points of the render output associated with it; and issue graphics fragments to the remainder of the graphics processing pipeline for processing;

and wherein the rasteriser is further configured to if a smaller patch of the render output in the set of smaller patches of the render output encompassed by a larger patch of the render output that the larger patch of the render output is to be sub-divided into is found when the larger patch of the render output is tested to entirely pass the edge test for an edge of the primitive, note that event in state information associated with the primitive edge in question, and use that state information when testing the smaller patch of the render output that was found when tested to entirely pass the edge test for the edge of primitive against the primitive to skip the testing of the edge in question against the smaller patch of the render output.

The rasterisation process of the technology described herein tests larger patches of a render output to be generated against a primitive to be rasterised, to determine if the primitive covers (at least in part) any smaller patches of the render output that the larger patch encompasses. If the primitive does cover (at least in part) any smaller patches of the render output that the larger patch encompasses, then the larger patch is sub-divided into those smaller patches, and the process is then repeated for each smaller patch of the render output that was found to be at least partially covered by the primitive. In this way, the rasterisation process operates to iteratively test the primitive against progressively smaller patches of the render output.

A fragment or fragments is then generated for rendering for patches of sampling points found to be covered at least in part by the primitive in question.

The technology described herein also identifies when a given smaller patch of the render output is found to entirely pass the edge test for an edge of the primitive in question (i.e. the entire smaller patch passes the edge test) when the larger patch encompassing that smaller patch is tested, and in that event, uses that fact to avoid testing that edge again when the smaller patch of the render output that was found to entirely pass the edge test for the edge of the primitive is to be tested against the primitive. This is possible because, as the Applicants have recognised, if the larger patch of the render output entirely passes the edge test for an edge of a primitive, any smaller patch of the render output that the larger patch is then divided into as part of the rasterisation process must also entirely pass the edge test for the primitive edge in question. Thus, the subsequent patch subdivision can be done without the need to evaluate (test) the edge in question again, such that the edge test in question can be skipped (and this is what is done).

While this operation of the technology described herein does require the use of additional state information to track and indicate the patches of the render output that are found to entirely pass the edge test for an edge of a primitive (to thereby allow the lower level (smaller) patch edge evaluations to be omitted), the Applicants believe that this extra cost will be outweighed by the processing savings and increased rasterisation speed facilitated by (potentially) removing the need to evaluate all the primitive edges at all patch sub-division levels as the rasterisation proceeds. Indeed, the Applicants have found that the technology described herein can remove most of the lower level edge checks for partially covered patches of the render output, and all (100%) of the lower level edge checks for fully covered patches of the render output.

The render output to be generated and that is divided into patches for the purposes of the rasterisation process in the present embodiment may comprise any render output that is to be generated by the graphics processing pipeline. Thus it may comprise, for example, a tile to be generated in a tile-based graphics processing system, and/or a frame of output fragment data.

The patches that the render output is divided into for the rasterisation process can be selected as desired. Each patch within a given level of patches should represent a respective different region (area) of the render output to be generated. The patches in an embodiment each correspond to a plurality of sampling positions of the render output to be generated.

The patches that the render output is divided into for the rasterisation process in an embodiment all have the same shape. Each patch that the render output to be generated is divided into for the rasterisation process is in an embodiment a regularly shaped area of the render output. The patches are in an embodiment rectangular (including squares). In an embodiment, the patches are square.

In an embodiment, all the patches at given subdivision level have the same size, and in an embodiment also the same shape, as each other (i.e. in an embodiment cover the same number of sampling positions of the render output).

The respective sets of plural smaller patches of the render output that each larger patch of the render output is divided into (encompasses) may contain any desired (plural) number of smaller patches of the render output. Each set of plural smaller patches that a given larger, higher level patch encompasses in an embodiment comprises an integer number of plural smaller patches. In an embodiment, each larger patch is divided into a set of four smaller patches for the rasterisation process. In an embodiment, each larger patch is to be divided into (encompasses) a 2×2 set (array) of smaller patches.

Thus, in an embodiment, the patches are arranged such that a (and each) larger patch encompasses (and will accordingly be subdivided into) a set four smaller patches, with each smaller patch being a quarter of the size of the larger patch.

Varying the patch sizes by a factor of 4 in each successive subdivision level is a particularly a convenient arrangement for progressively decreasing the patch size as the rasterisation process proceeds. However, it is not essential and other arrangements could be used if desired.

Each patch of the render output that is tested in an embodiment corresponds to an integer number of fragments, such as 16×16, 8×8, 4×4 and/or 2×2 fragments. In an embodiment, the largest patches each correspond to 16×16 fragments, with the next smaller second level patches being 8×8 fragments, and the third level, smaller patches being 4×4 fragments.

The rasterisation process could simply test two levels of patches (so a larger patch and then a set of smaller patches that the larger patch is subdivided into), but in an embodiment more than two levels of patches can be (and in an embodiment are) tested (i.e. the second level patches can themselves be sub-divided into the third level, smaller patches that they encompass, and then those third level, smaller patches that the second level patches are divided into, themselves encompass sets of smaller, fourth level patches against which the edges of the primitive can then be tested (and so on (if desired)).

Thus, the rasterisation process can in an embodiment test more than two (three or more) levels of patches (can sub-divide at least two levels of patches into smaller patches for testing). In an embodiment, four levels of patches (and so three rounds of subdivision) are supported.

At each level of subdivision, the fact that a patch has previously been found to entirely pass the edge test for an edge of the primitive being tested is in an embodiment used to skip processing of the patch for the edge in question at the subdivision level, as appropriate.

In an embodiment, the rasterisation process continues to sub-divide and test any patch found to be at least partially covered by a primitive until a particular, in an embodiment selected, in an embodiment predetermined, minimum (final) patch size is reached. The minimum patch size could, e.g., be an individual sampling point, an individual fragment, or a given sized group of fragments. In an embodiment, the minimum patch size corresponds to a 2×2 group of fragments.

Thus, in an embodiment, the rasterisation process starts by testing the primitive against a first set of larger patches of the render output and progressively subdivides each larger patch of the set that is found to be at least partially covered by the primitive into a set of smaller patches of the render output until a minimum patch size is reached.

Where the patch sub-division can (potentially) proceed down a number of sub-division levels, then the determination that a larger patch entirely passes the edge test is in an embodiment used to skip testing that edge against any smaller patch that is (and all smaller patches that are) encompassed by the larger patch as the sub-division proceeds, i.e. is used to skip the edge-test for any (appropriate) lower level patches that are within the larger patch (and not just the immediately lower level (smaller) patch that the larger patch encompasses).

A primitive to be rasterised could be tested against each first level (larger size) patch that the render output is divided into, or, alternatively, the primitive could be tested against a selected set of those first level (larger size) patches, such as a set of those patches based on the area of the render output that it is expected the primitive will cover, such as the set of patches that are covered by a bounding box generated for the primitive.

As discussed above, where it is found that a patch is at least partially covered by the primitive being tested, then the patch will be subdivided into a set of smaller patches, and those smaller patches tested (and potentially sub-divided), and so on (in an embodiment until a final, minimum patch size is reached).

Thus, the rasterisation process in an embodiment comprises, if the primitive does at least partially cover a larger patch of the render output, subdividing that patch of the render output into a set of plural smaller patches of the render output, and testing one or more of those smaller patches of the render output against the edges of the primitive to determine if the primitive at least partially covers any of those smaller patches of the render output and so on, in an embodiment until a minimum patch size is reached.

Any patch of the render output that is found not to be covered (at least in part) by the primitive is in an embodiment not processed further for the primitive in question. Thus, if the primitive does not at least partially cover a patch of the render output being tested, the patch is in an embodiment discarded, and the process moves on to the next patch (if any). Thus, the rasterisation process in an embodiment comprises discarding, for the primitive being tested, a (and in an embodiment each) patch of the render output that the primitive is found to not at least partially cover.

Similarly, where a patch of the render output is found to be entirely covered by (within) the primitive (i.e. the patch entirely passes the edge test for each of (for all) the edges of the primitive being considered), then the patch is in an embodiment not tested further (not sub-divided further) for the primitive in question (and the rasteriser in an embodiment then operates instead to generate and issue graphics fragments for rendering the patch). (This will also be discussed in more detail below.)

It is believed that this arrangement may be new and advantageous in its own right. Thus, another embodiment of the technology described herein comprises a method of performing rasterisation in a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data, the method comprising:
   the rasteriser, when it receives a primitive to be rasterised,
      for each of one or more first-level patches representing respective different regions of a render output to be generated:
         testing the patch against the edges of the primitive to determine if the primitive at least partially covers any patch of a set of plural smaller second-level patches of the render output that the first-level patch of the render output encompasses;
      and if the primitive does at least partially cover any smaller second-level patch of the set of plural smaller second-level patches of the render output that the first-level patch of the render output encompasses, subdividing the first-level, larger, patch of the render output into the set of smaller second-level patches that the first-level larger patch of the render output encompasses, and for each second-level smaller patch of the render output that the primitive does at least partially cover, testing that second-level smaller patch of the render output against the edges of the primitive to determine if the primitive at least partially covers any patch of a set of plural smaller third-level patches of the render output that the second-level smaller patch of the render output encompasses;
the method further comprising the rasteriser:
generating one or more graphics fragments for rendering for patches of the render output found to be covered at least in part by the primitive, each graphics fragment having one or more sampling points of the render output associated with it; and
issuing the graphics fragments to the remainder of the graphics processing pipeline for processing;
and the method further comprising:
   if a patch of the render output is found when tested to entirely pass the edge test for all the edges of the primitive, generating one or more graphics fragments for rendering the patch of the render output found to entirely pass the edge test for all the edges of the primitive without edge testing or sub-dividing the patch further.

Another embodiment of the technology described herein comprises a graphics processing pipeline comprising:
   a plurality of processing stages, including a rasteriser that rasterises input primitives to generate graphics fragments to be processed, each graphics fragment having one or more sampling points associated with it, and a renderer that processes fragments generated by the rasteriser to generate output fragment data;
   and wherein the rasteriser is configured to, when it receives a primitive to be rasterised, for each of one or more first-level patches representing respective different regions of a render output to be generated:
   test the patch against the edges of the primitive to determine if the primitive at least partially covers any patch of a set of plural smaller second-level patches of the render output that the first-level patch of the render output encompasses;
   and if the primitive does at least partially cover any smaller second-level patch of the set of plural smaller second-level patches of the render output that the first-level patch of the render output encompasses, subdivide the first-level, larger, patch of the render output into the set of smaller second-level patches that the first-level larger patch of the render output encompasses, and for each second-level smaller patch of the render output that the primitive does at least partially cover, test that second-level smaller patch of the render output against the edges of the primitive to determine if the primitive at least partially covers any patch of a set of plural smaller third-level patches of the render output that the second-level smaller patch of the render output encompasses;

and wherein the rasteriser is further configured to:
generate one or more graphics fragments for rendering for patches of the render output found to be covered at least in part by the primitive, each graphics fragment having one or more sampling points of the render output associated with it; and
issue graphics fragments to the remainder of the graphics processing pipeline for processing;
and wherein the rasteriser is further configured to
if a patch of the render output is found when tested to entirely pass the edge test for all the edges of the primitive, generate one or more graphics fragments for rendering for the patch of the render output found to entirely pass the edge test for all the edges of the primitive without edge testing or sub-dividing the patch further.

As will be appreciated by those skilled in the art, these embodiments of the technology described herein can and in embodiments do include any one or more or all of the features of the technology described herein described herein, as appropriate.

The rasterisation process in an embodiment takes each largest-size patch to be tested against a primitive in turn, and sub-divides that patch and then tests the relevant sub-patches, and so on, until all sub-division and testing for that largest-size patch has been completed, before moving on to the next largest-size (highest level) patch. In other words, the rasterisation process in an embodiment tests and (fully) sub-divides each largest (highest level) patch in turn, one after another.

Thus, the rasteriser in an embodiment starts with a highest level, largest size patch that encompass a relatively larger region of the render output area, and tests if the primitive in question is inside that region (patch) of the render output. If not, the patch is discarded, and the next patch is tested (if appropriate). If the primitive is found to be within the patch (to cover, at least in part, the patch), the patch is sub-divided into a set of smaller patches (and in an embodiment into 4 patches), and each individual smaller "sub-patch" that was found to be covered by the primitive when testing the large patch is then tested in the same way, and so on. The "sub-patches" are in an embodiment tested in the order $$\begin{bmatrix} 0 & 1 \\ 3 & 2 \end{bmatrix},$$

as this gives better cacheability.

Where as part of this process, a patch is found not to be covered at all by the primitive, then as discussed above, that patch is not processed further for the primitive in question. In this event, the rasterisation process in an embodiment simply moves on to the next patch (if any) at the patch subdivision level being considered, tests that patch against the primitive (and e.g. subdivides the patch or discards the patch, as and if appropriate).

Similarly, where as part of this process, a patch is found to be covered entirely by the primitive, then as discussed above, that patch is not sub-divided or tested further for the primitive in question. In this event, the rasterisation process in an embodiment simply moves on to the next patch (if any) at the patch subdivision level being considered, tests that patch against the primitive (and e.g., subdivides the patch or discards the patch, as and if appropriate).

This process is in an embodiment continued until all subdivision and testing of the patches within (encompassed by) the first level, largest size patch being considered has been completed.

Once this is done, the rasterisation process in an embodiment then moves on to the next first level, largest size patch, and tests that patch, and so on, until all the first level, largest size patches that the primitive is to be tested against have been tested.

Once all the highest level, largest size patches of the render output have been tested against a primitive (and subdivided, discarded or rasterised to fragments, as appropriate), then the rasterisation process in an embodiment moves on to the next primitive for the render output being generated and so on, until all the primitives for the render output in question have been rasterised.

The process in an embodiment then moves on to the next render output (e.g. tile) to be generated once all the primitives for the render output in question have been rasterised, and so on.

The rasteriser and rasterisation process can be configured as desired to
operate in the manner of the technology described herein. Thus, for example, the patches could be passed through the rasteriser one at a time. However, in an embodiment, the rasteriser is configured as a pipeline that can contain and process plural patches at the same time.

The rasteriser and rasterisation process of the technology described herein generates graphics fragments for processing by the rest of the graphics pipeline (such as the renderer) corresponding to patches of the render output that are found to be covered (at least in part) by a primitive. Each fragment in an embodiment represents sampling points (or sets of sampling points) of an array of sampling points covering the area of the render output to be generated. Each fragment generated by the rasteriser may represent (have associated with it) a single sampling point, or plural sampling points, as desired. In an embodiment, each fragment represents a set of plural, in an embodiment a set of four (and in an embodiment a 2×2 array of), sampling points.

The rasteriser in an embodiment generates a graphics fragment for each sampling point covered by, and/or for each set of plural sampling points (e.g., sampling mask) found to include a sampling point that is covered by, the (and each) primitive being rasterised (and that is not otherwise culled from processing for another reason, such as being occluded by another primitive).

The rasteriser generates the graphics fragments in dependence on the patches of the render output that it determines are covered (at least in part) by the primitive in question. In an embodiment a graphics fragment or fragments for rendering is generated for each minimum size patch of sampling points found to be covered at least in part by the primitive (and that is not otherwise culled from processing for another reason, such as being occluded by another primitive). Where the minimum patch size corresponds to a 2×2 array of fragments, up to 4 fragments will accordingly be generated for each minimum size patch of sampling points found to be covered at least in part by the primitive (depending on how much of the minimum patch the primitive actually covers).

The number of fragments that are generated for a given covered patch will depend upon the relative sizes of the patches and fragments. Thus, for example, for smaller patches, only one (or a few) fragments may be generated, but if a larger patch is found to be completely covered by the primitive, a larger number of fragments will be generated.

As discussed above, in an embodiment, each patch corresponds to an integer number (and array) of fragments, and so the number of fragments corresponding to the patch size in question will be generated (where the patch is completely covered by the primitive).

Where a given patch is found to be completely covered by a primitive, then the appropriate number of "fully-covered" fragments can be, and in an embodiment are, simply generated for the patch in question. However, where patches that are only partially covered are sub-divided further until the lowest sub-division level is reached (such that the smallest (minimum) patch size is reached), then for all of the smallest (minimum) size patches that are not already known to be completely covered by the primitive, the rasteriser in an embodiment then tests the individual sampling points in the final, minimum size patch to see if they are covered by the primitive, and then generates fragments accordingly.

The rasteriser may be configured to generate the fragments one at a time, but in an embodiment is able to generate plural fragments at a time (simultaneously) (e.g. where a primitive is found to completely cover a patch of the render output that encompasses plural fragments (e.g. plural sampling points or sets of sampling points)). In this case, if the rasteriser simultaneously generates a set of plural fragments, the fragments within the set are in an embodiment still processed individually by the fragment processing parts of the pipeline, such as the renderer (fragment shader). Having the rasteriser produce plural fragments simultaneously helps to create back pressure to thereby keep the rendering pipeline "filled up" with fragments.

Where the fragments that are generated by the rasteriser can be associated with (and correspond to and represent) sets of plural sampling points, then each such graphics fragment in an embodiment has associated with it data indicating which of the sampling points in the set of sampling points that the fragment corresponds to are covered (e.g., and in an embodiment, by the primitive being sampled), i.e. in effect, which of the sampling points in the set of sampling points that the fragment corresponds to, the fragment is being used to render.

The information indicating which covered sample points the fragment is being used to render is in an embodiment associated with or part of the fragment data for the fragment that passes through the renderer (such as the RGB and alpha values for the fragment). In an embodiment, it is in the form of a coverage mask that indicates, for each sample position of the set of sample points that is associated with the fragment, whether that sample position is covered, i.e., in effect, whether the fragment is being used to render that sample point (i.e. whether its data should be stored for that sample point). In an embodiment this coverage mask is in the form of a bitmap that represents the sampling positions. In an embodiment the rasteriser generates the coverage masks.

The state information that is used to record and indicate that a patch of the render output has passed an edge test can take any desired and suitable form. The state information is in an embodiment associated with the primitive edge and (smaller) patch of the render output in question. In an embodiment it comprises a state bit for each edge and patch of the render output that can be set to indicate that the patch passes the edge test or not. This state bit can then be checked when processing the individual "sub-patches" of the larger patch of the render output in question to determine if the edge test needs to be performed for the "sub-patch" in question (has already been passed by the "sub-patch" in question) or not.

In an embodiment, the rasteriser when it tests a primitive against a larger patch of the render output, generates a coverage mask for the set of smaller patches of the render output that the larger patch is to be sub-divided into, which coverage mask includes, for each smaller patch that the larger patch includes (i.e. will be divided into for the next rasterisation sub-division), an edge test state bit in respect of each edge that has been tested. The coverage mask can then be checked when the individual smaller "sub-patches" of the larger patches in question are to be processed by the rasteriser, to see if the edge tests can be skipped or not.

The coverage mask in an embodiment also includes coverage data indicating which smaller patches in the set of smaller patches that the larger patch is to be sub-divided into were found to be covered (at least in part) by the primitive in question. This coverage data is in an embodiment in the form of a bitmap indicating which of the smaller patches are covered. In an embodiment the coverage data indicates whether each smaller patch is fully or partially covered by the primitive in question.

In an embodiment, the coverage mask for a patch of the render output that has been tested also indicates the size of the smaller patches (the sub-patch" size), and the x, y position of the set of smaller patches (in an embodiment in terms of its relative position within the highest level (largest size) patch of the render output that has been considered for the position in the render output of the patch in question).

The coverage mask can then be checked when the smaller sub-patches of the larger patch in question are to be processed by the rasteriser, to see if those smaller patches need to be processed or not.

The state information for the edge tests can be used as desired to allow subsequent edge testing of patches of the render output to be skipped. In an embodiment, if the edge equation is determined to be passed by a given patch of the render output, the rasteriser operates to set the state information (e.g. state bit) to indicate that. In an embodiment, when a patch of the render output is to be tested against an edge, the state information is first checked, and if it indicates that the patch has already been determined to pass the edge test for an edge (e.g. the state bit is set), the edge test is not performed, and instead the process moves on to the next stage, such as checking or testing the next edge, or the next patch of the render output, or the next primitive, etc., as appropriate. The state bits are in an embodiment checked in parallel, and the edges are in an embodiment processed one after another with no spacing in between.

Thus, in an embodiment, the method of the technology described herein comprises, and the rasteriser of the technology described herein is configured to, when it is determined that a patch of the render output passes the edge test in respect of an edge of a primitive being rasterised, set state information (and in an embodiment a state bit) associated with that edge to indicate that the patch has passed the edge test.

Similarly, in an embodiment, the method of the technology described herein comprises, and the rasteriser of the technology described herein is configured to, when a patch of the render output is to be tested against an edge of a primitive being rasterised as part of the rasterisation process, first checking state information (and in an embodiment a state bit) associated with the primitive edge in question to determine if that state information indicates that the patch of the render output will pass the edge test for the edge in question or not, and if the state information indicates that the patch will pass the edge test for the edge in question, not performing the edge test for the edge in question for the patch of the render output, or if the state information does not indicate that the patch will pass the edge test for the edge in question, performing the edge test for the edge in question for the patch of the render output.

The edge test that is performed for an (and each) edge of the primitive should be configured to indicate whether the patch, sampling point, etc., being tested should be treated as lying within that edge of the primitive (i.e. is inside, or on or inside (depending on the nature of the edge test), the edge in question) (such that passing the edge test indicates that the patch, etc., is within that edge of the primitive in question) (such that any patch that entirely passes the edge test will be entirely inside (or on or inside) the edge in question). As discussed above, one common form of the edge test is to consider the test passed if a positive value is returned. In this case, patches, etc., that entirely pass the edge test will accordingly lie entirely on the positive side of the edge. Other arrangements and forms of edge test would, of course, be possible (and the technology described herein is applicable to any form of edge test).

The rasteriser can test the edges of the primitive against the patches of the render output in any suitable and desired manner to determine if the primitive covers the patch (at least in part). For example, edge equations for the primitive's edges could be derived, and then tested against the corners of the patches of the render output, to see if the corners are covered by the primitive or not.

In an embodiment, the rasteriser determines whether a patch is covered, at least in part, by a primitive, by one or more of, and in an embodiment all of: determining whether the edges of the patch are within the primitive; testing whether the edges of the patch are crossed by the primitive; and testing whether the vertices of the primitive are within the patch or lie on the edge of the patch.

In an embodiment, the rasteriser determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

These tests may be performed as desired. In an embodiment a grid of sampling points is derived for the patch (and for each patch) being tested, and those sampling points then used with (line) equations representing the edges of the primitive in question to determine if the patch is at least partially covered by the primitive.

In an embodiment, the rasteriser and rasterisation process is configured to also perform culling testing, such as occlusion testing, such as, and in an embodiment depth (Z) and/or stencil testing, on the patches of the render output that it is testing against a primitive, to see if the patches of the render output can be discarded from further processing on the basis of the culling (e.g. depth and/or stencil) test. This can help to avoid sending patches, e.g. that are occluded by already processed primitives, through the rendering pipeline.

This "early", patch culling test in an embodiment comprises a depth (Z) test (or tests). In an embodiment it comprises both depth and stencil tests.

Thus, in an embodiment, as well as the rasteriser testing a primitive against a larger patch of the renderer output to determine if the primitive at least partially covers any of the patches in a set of smaller patches encompassed by the larger patch, a culling test (and in an embodiment a depth test) is also performed for each smaller patch of the render output that the primitive at least partially covers, and if the patch of the render output being tested fails the early culling test (e.g. is found to be occluded in its entirety), then that patch of the render output is in an embodiment not processed further for the primitive in question (is in an embodiment "culled" from further processing in the rasteriser).

The culling test or tests themselves can be carried out in any suitable and desired manner, e.g., in the normal manner known in the art and/or used in the graphics processing system in question. Thus, e.g., a depth value or values associated with a new patch being processed is in an embodiment compared to the current depth value or values for that patch position in the render output (depth buffer) to see if the new patch is occluded or not.

The culling test(s) is in an embodiment carried out in an appropriately conservative manner, as is known in the art. It may, e.g., test sampling points for a patch of the render output specifically, or may be a test or tests that have the effect of testing sampling point(s) for the patch, even if the (or each) sampling point is not specifically tested.

In one embodiment, the rasteriser has an associated depth test that compares depth value ranges associated with the patches of the render output being tested to determine if the patches of the render output being tested will be occluded (pass the early depth test) or not. Thus in one embodiment, the patch depth test uses ranges of depth values for the patches of the render output. A depth value range is accordingly in an embodiment stored for each patch of the render output that may be considered (cull tested).

Associating ranges of depth values with the patches of the render output facilitates depth testing incoming primitives against larger patches of the render output in one go.

In an embodiment, if the early culling test is passed, any data buffer, such as a depth buffer, etc., associated with that test and/or that contains data related to that test is updated as well, e.g., and in an embodiment, with the relevant data value(s), e.g. depth value(s), associated with the patch or patches of the render output that has passed the culling test.

Thus, in an embodiment, where the graphics processing pipeline includes an early depth testing stage as part of the rasteriser that has an associated depth buffer that stores depth values to be compared with the depth values for patches of the render output when performing the early depth test, the graphics processing system is configured to also (appropriately) update the depth values stored in the depth buffer associated with the early depth testing stage when a patch passes the early depth test.

The early updating of the depth buffer, etc., is in an embodiment carried out in an appropriately conservative fashion, so as to avoid any risk that the updates could cause errors in the processing of future patches, etc.

In one embodiment of these arrangements, the culling, e.g. depth and/or stencil, tests are performed at each level of the render output patch subdivision (for covered patches) down to, and including, the lowest sub-division level (i.e. down to the final, minimum patch size). This will then straightforwardly allow any, e.g., depth values associated with a primitive being rasterised to be fully propagated to all the patches of the render output at each sub-division level that the primitive covers (i.e. for the, e.g., depth buffer to be appropriately updated for all the patches of the render output at each sub-division level that the primitive covers).

In this case, even if it is determined that a set of patches of sampling points encompassed by a larger patch is fully covered by a primitive and so the edge testing of the lower level, smaller patches within the set of patches in question can be skipped, the lower level, smaller patches will still be generated (the patch sub-division will still be performed), and subjected to the depth and/or stencil tests, so as to allow updating of the depth buffer(s) (e.g.) (but there will still be a processing saving, as the edge tests for the lower level patches will be omitted).

However, the Applicants have recognised that the above principles and processes relating to the edge testing of patches of sampling points can similarly be applied to culling tests, such as depth and stencil tests, that are performed on the patches of the render output. For example, where it is determined that a fully covered higher level, larger patch passes a depth test, it can then be assumed that any smaller patches within that larger patch will similarly pass the depth test.

The Applicants have accordingly recognised that where a patch of the render output is determined to be fully covered by the primitive, and to pass any culling test or tests, such as a depth test, that the patch is to undergo (such that the entire patch is determined as needing to be rendered), it would be possible to at that stage generate and issue fragments for rendering the patch, without the need to further sub-divide and test the patch. In an embodiment, this is what is done.

Thus, in an embodiment, the rasteriser and rasterisation process is configured to perform a culling test, such as a depth test, on patches (and in an embodiment on each patch) of the render output that it is testing a primitive against, and to, if it is determined that the patch passes the culling test and is completely covered by the primitive in question, generate and issue one or more graphics fragments for processing the patch of the render output in question without further sub-dividing or further testing the patch of the render output. In this case, the fragments could, e.g. be issued immediately, or they could, e.g., be delayed in order to preserve the processing order of the primitives, as desired and appropriate.

In other words, where it is determined that a higher level of patch of the render output will pass all of the edge and culling, e.g. depth (and stencil, if appropriate), tests, that patch is in an embodiment not further sub-divided and tested, but instead the appropriate set of fragments for rendering the patch in question is issued by the rasteriser for rendering at that point. This then allows the rasterisation process to stop the rasterisation of (suitable) fully covered patches of the render output at a higher level in the rasterisation sub-division hierarchy, thereby further enhancing the efficiency of the rasterisation process.

Thus, in an embodiment, the method of the technology described herein further comprises when the rasteriser tests a patch of the render output against the edges of a primitive to determine if the primitive at least partially covers any patch of a set of plural smaller patches of the render output that the patch of the render output encompasses, also:

subjecting the patch of the render output to a culling test to determine if any patch of the set of plural smaller patches of the render output that the patch of the render output encompasses pass the culling test; and if the primitive completely covers a smaller patch of the set of plural smaller patches of the render output that the larger patch of the render output encompasses, and that smaller patch of the set of plural smaller patches of the render output that the larger patch of the render output encompasses passes the culling test:

generating one or more graphics fragments for rendering the smaller patch of the render output found to be completely covered by the primitive and to pass the culling test, and issuing the graphics fragments to the remainder of the graphics processing pipeline for processing, without further sub-dividing and testing the smaller patch of the render output found to be completely covered by the primitive and to pass the culling test.

Similarly, in an embodiment the graphics processing pipeline of the technology described herein includes an early culling test stage that operates in conjunction with the rasteriser to, when the rasteriser tests a patch of the render output against the edges of a primitive to determine if the primitive at least partially covers any patch of a set of plural smaller patches of the render output that the patch of the render output encompasses:

also subject the patch of the render output to a culling test to determine if any patch of the set of plural smaller patches of the render output that the patch of the render output encompasses pass the culling test;

and the rasteriser is further configured to:

if a primitive is found to completely cover a smaller patch of the set of plural smaller patches of the render output that a larger patch of the render output encompasses, and that smaller patch of the set of plural smaller patches of the render output that the larger patch of the render output encompasses is found to pass the culling test:

generate one or more graphics fragments for rendering the smaller patch of the render output found to be completely covered by the primitive and to pass the culling test, and issue those graphics fragments to the remainder of the graphics processing pipeline for processing, without further sub-dividing and testing the smaller patch of the render output found to be completely covered by the primitive and to pass the culling test.

In these embodiments, the rasteriser and rasterisation process accordingly stops the sub-division process and generates one or more graphics fragments for rendering for a patch of the render output once it is determined that the patch of the render output is completely covered by a primitive and passes the early culling, e.g. depth, test. In an embodiment the fragments are generated and issued immediately it is determined that the patch of the render output is completely covered by a primitive and passes the early culling, e.g. depth, test (subject to any requirement to maintain the primitive order).

These arrangements in embodiments further comprise, if a (smaller) patch is determined to fail the culling test (e.g. to be occluded by another primitive), not processing the smaller patch further for the primitive in question (discarding the smaller patch, in an embodiment immediately).

In an embodiment, the edge tests are performed first, and the culling test is in an embodiment only performed for those patches that pass an edge test (i.e. are at least partially covered by the primitive in question).

In these embodiments, the culling test is in an embodiment a depth test, although it could be another culling test, such as a stencil test, if desired. In an embodiment, both depth and stencil testing is performed.

Thus, there may be a single patch culling test, such as a depth test, or there may be more than one patch culling test, such as depth and stencil tests. Where there is more than one patch culling test, in an embodiment only fully covered patches that pass all the patch culling tests are rasterised to fragments for rendering without further sub-division and testing.

The number of fragments that are generated for a patch that is determined to be fully covered and to pass the culling test(s) should correspond to the number of fragments that the patch in question corresponds to. Thus, where, as discussed above, each patch corresponds to an integer number (and array) of fragments, the number of fragments corresponding to the patch size in question will be generated where a patch is found to be completely covered by the primitive and to pass the culling test(s).

The Applicants have recognised that where the further sub-division and testing of a higher level patch is omitted, then the culling, e.g. depth and/or stencil, testing of lower level patches of the render output that are encompassed by the higher level, larger patch will not take place. This may then mean that the depth and/or stencil values (e.g.) for the lower level (smaller) patches of the render output that are stored and used for the patch depth and stencil tests (e.g.) may not be fully updated at the time the larger patch passes the tests, as the lower level patches will not be subjected to the, e.g., depth and/or stencil tests. In this case, the depth, etc., values for the relevant lower level patches are in an embodiment marked as "invalid" (as they may no longer be correct).

Thus, in an embodiment the rasteriser and rasterisation process is configured to still propagate culling test, e.g. depth and/or stencil, values (as appropriate), down the sub-division levels where the culling, e.g. depth and/or stencil, testing is stopped at a higher level in the sub-division hierarchy.

Thus, in an embodiment, where the sub-division and testing of patch of the render output for a primitive is stopped because the patch is determined to be fully covered and to pass the culling test(s), the rasteriser and rasterisation process is configured to be able to propagate the culling test values, e.g. depth values (and/or stencil values), for that patch to any lower level (smaller) patches of the render output that are within the patch that is fully covered and that passed the culling test.

The culling test, e.g. depth and/or stencil, values for a patch can be propagated in these circumstances to lower level patches in any suitable and desired manner. In an embodiment, this is done by storing the culling test, e.g. depth and/or stencil, values for the larger patch also in association with each lower level, smaller patch of the render output that the larger patch encompasses. In other words, the culling test, e.g. depth and/or stencil, values for the larger patch are in an embodiment copied to the lower level, smaller patches that the larger patch encompasses. Thus, for example, where the patches each have depth value ranges associated with them, the depth value ranges for the larger patch are in an embodiment copied to (used to update the depth value ranges for) the lower level, smaller patches.

The culling test, e.g. depth and stencil, values could be propagated to (stored for or copied to) the lower level patches immediately the further sub-division of a higher level patch is stopped. However, in an embodiment the culling test, e.g. depth and stencil, values are only propagated to (stored for or copied to) the lower level patches after (if and when) it is determined that another primitive at least partially covers the patch in question (as it is only in this circumstance that the culling test, e.g. depth, values for the initial primitive will need to be considered for the lower level patches of the render output).

Thus, in an embodiment, if a patch is fully covered, and passes the culling test(s), the subdivision is stopped for that patch, and a culling test value or values is stored for the fully covered patch. Then, when a new primitive is tested and deemed to at least partially cover the patch of the render output in question, the culling test value or values for the old primitive is propagated to (copied to) the relevant, and in an embodiment to all, smaller patches (sub-patches) within the original fully covered patch.

Smaller patches (sub-patches) found not to be covered at all by the new primitive in an embodiment then (and will then) keep the old primitive's culling test values(s), but smaller patches (sub-patches) fully covered by the new primitive are in an embodiment then (and will then be) set to the new primitive's culling test value(s) (e.g. once a new primitive covering those patches falls to be tested).

Any partially covered smaller patches (sub-patches) are in an embodiment subdivided further using the technique of the technology described herein until the lowest subdivision level is reached. Partially covered patches, where two primitives share the patch coverage, in an embodiment have a depth value range encompassing both primitives associated with (stored for) them.

Although the technology described herein has primarily been described above with regard to the rasterisation of a single primitive to be processed by the graphics processing pipeline, as discussed, this process should be repeated for each primitive that the graphics processing pipeline receives for processing. Thus, in the case of a tile-based graphics processing system, the above rasterisation process will be repeated for each primitive that is to be processed to generate a given output tile of a rendered target to be generated by the graphics processing pipeline, and then when a given tile has been completed, performed again for the next tile and so on, until all the tiles necessary to generate the desired render output, such as a frame for display, have been processed. The process will then be repeated for the next render output (e.g. frame for display), and so on.

As well as the rasteriser, the graphics processing pipeline can and should include other processing stages that are required to generate the required render output, such as, and in an embodiment, a renderer. It may also include other units and stages that are normally present in graphics processing pipelines, such as tile (and other) buffers, a writeback unit, etc.

The renderer of the graphics processing pipeline should be operable to render (shade), graphics fragments it receives to generate the desired output graphics fragment data, as is known in the art. It may contain any suitable and desired rendering elements and may be configured in any suitable and desired manner. Thus, for example, it may comprise a fixed function rendering pipeline, including one or more fixed function rendering stages, such as texture mappers, blenders, fogging units, etc. In an embodiment the renderer comprises a fragment shader (a shader pipeline) (i.e. a programmable pipeline stage that is operable to and can be programmed to carry out fragment shading programs on fragments in order to render them).

As will be appreciated by those skilled in the art, the renderer will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile buffer (as will be the case in a tile-based graphics processing system), as is known in the art.

The graphics processing pipeline may also comprise, and in an embodiment does also comprise, and/or is in communication with, one or more memories and/or memory devices that store the data described herein, such as the fragment data, the rendered fragment and output data, the patch state information (e.g. coverage mask), depth value data, etc., and/or that store software for performing the processes described herein. The graphics processing pipeline may also be in communication with a host microprocessor, and/or with a display for displaying images based on the data generated by the graphics processor.

The technology described herein can be used irrespective of the form of output that the graphics processing system may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics processing system, graphics processor, and renderer having a "pipelined" arrangement. The graphics processing pipeline can contain any suitable and desired processing stages, etc., that graphics processing pipelines normally include. The technology described herein is particularly applicable to tile-based graphics processors and graphics processing systems, and to multi-core graphics processing systems. Thus, in an embodiment, the graphics processing system is a tile-based graphics processing system. Similarly, in an embodiment, the graphics processing system is a multi-core system (i.e. includes plural graphics processing cores).

The technology described herein accordingly extends to a graphics processor and a graphics processing platform including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology and optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a graphics processor 1 in the form of a graphics processing pipeline that may operate in accordance with the technology described herein.

FIG. 1 shows the main elements and pipeline stages of the graphics processor 1 that are relevant to the operation of the present embodiment. As will be appreciated by those skilled in the art there may be other elements of the graphics processor that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor as shown in FIG. 1 may be implemented as desired and will accordingly comprise, e.g., appropriate circuitry and/or processing logic, etc., for performing the necessary operation and functions.

The graphics processing system shown in FIG. 1 is a tile-based system. The graphics processor 1 will thus, as is known in the art, produce tiles of a render output data array, such as an output frame to be generated. (The technology described herein is equally applicable to other systems, such as immediate mode rendering systems.) The output data array may, as is known in the art, typically be an output frame intended for display on a display device, such as a screen or printer, but may also, for example, comprise a "render to texture" output of the graphics processor, etc.

FIG. 1 shows schematically the pipeline stages after the graphics primitives (polygons) 2 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 1, as is known in the art.

As shown in FIG. 1, this part of the fragment processing pipeline of the graphics processor 1 includes a number of processing stages, including a rasteriser 10 that includes a rasterisation stage 3 and an early hierarchical ZS (depth and stencil) test stage 4, an early ZS (depth and stencil) test stage 9, a rendering stage in the form of a fragment shading stage 6, and a late ZS (depth and stencil) test stage 7. The pipeline also includes and/or has access to (is in communication with) appropriate memory for storing the data that the pipeline will use and/or generate, such as a depth and stencil buffer(s) 5, tile buffers 8, etc.

The rasteriser 10 operates, as is known in the art, to rasterise the primitives making up the render output (e.g. the image to be displayed) into individual graphics fragments for processing. To do this, the rasteriser 10 receives graphics primitives 2 to be rendered, rasterises the primitives to sampling points and generates graphics fragments having appropriate positions (representing appropriate sampling positions) for rendering the primitives. In the present embodiment, each graphics fragment that is generated by the rasteriser 10 represents (has associated with it) plural (and normally four) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 10 is a hierarchical rasteriser that operates to iteratively test primitives against progressively smaller patches (regions) of the render output (target) area (and thus, correspondingly, patches of fragments), down to a minimum patch size corresponding, in the present embodiment, to a 2×2 group of fragments (i.e. to an array of sampling points that would be rasterised to a 2×2 group of fragments), discarding any patches that are not (at least in part) covered by the primitive. Each patch that is tested corresponds to a given set of fragments.

The rasterisation stage 3 of the rasteriser 10 performs this render output patch testing. To do this, it starts with a large patch of the render output (the render target) area and tests the patch against the edges of the primitive in question to determine if the primitive at least partially covers any patch of a 2×2 set of smaller patches of the render output (the render target area) that the large patch is divided into (encompasses).

The edges of the primitive are represented by appropriate line (edge) equations that have been derived from the vertices of the primitive, as is known in the art, and a grid of sampling points is derived for the patch (and for each patch) being tested. The patch sampling points are then used with the line equations representing the edges of the primitive in question to perform an edge test for the edges to determine if the patch is at least partially covered by the primitive.

In the present embodiment, the rasterisation stage 3 determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

Other arrangements would, of course, be possible.

If it is found that the large patch is not covered by the primitive at all, then the patch is not processed further in respect of the primitive in question (i.e. the entire patch is discarded for the primitive in question), and another (the next) large patch is tested against the primitive, and so on.

On the other hand, if a primitive is found to at least partially cover any of the smaller patches of the set of plural smaller patches of the render output that the large patch encompasses (is divided into) (i.e. the primitive is found to cover, at least in part, the large patch), the large patch is subdivided into its four smaller patches, and each covered such smaller patch ("sub-patch") is then tested against the primitive and processed in the same way (i.e. discarded, or sub-divided into a set of smaller patches, depending upon whether it is covered by the primitive or not).

This patch testing and discarding or subdivision is continued until the minimum patch size is reached.

The present embodiment supports four levels of subdivision (three sub-division iterations) and so starts with large patches corresponding to 16×16 fragments, which are then (if appropriate) subdivided into four 8×8 fragment patches. Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would, of course, be possible.

Figure 2:
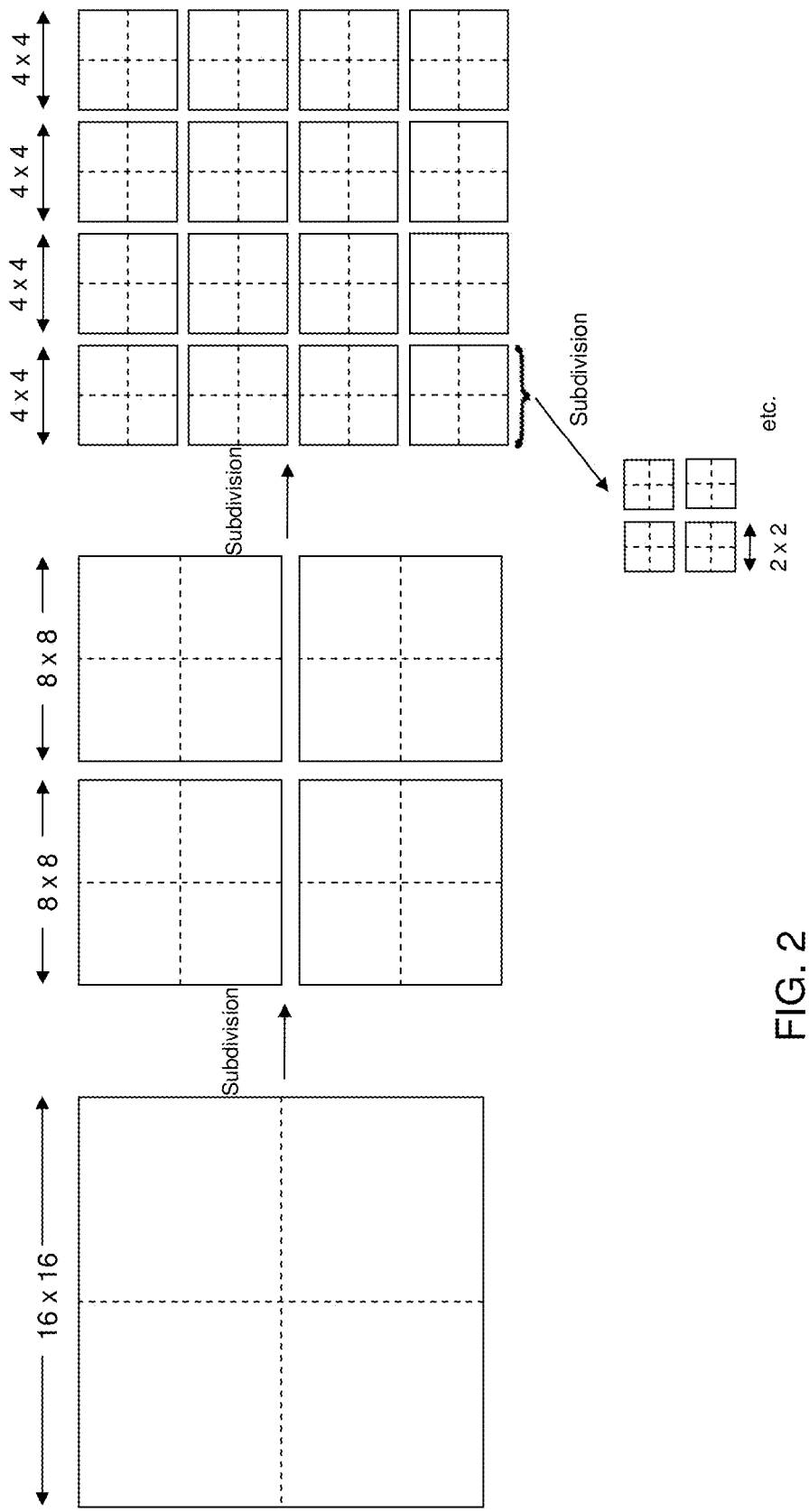
FIG. 2 illustrates the sub-division process that is used by the rasteriser in the described embodiment of the technology described herein.

FIG. 2 illustrates the subdivision process and shows a top level, 16×16 fragment, patch being progressively subdivided down to the minimum patch size of 2×2 fragments.

Once the minimum patch size has been reached (i.e. a patch of 2×2 fragments that covers, at least in part, the primitive has been identified), the rasterisation stage 3 then tests the individual sampling points in that final patch to see if the sampling points are covered by the primitive. The rasteriser 10 then generates and outputs individual fragments for rendering corresponding to the sampling points found to be covered by the primitive (so four fragments if all the 2×2 fragments in the minimum size patch are at least partially covered by the primitive).

The rasteriser 10 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

In the present embodiment, the rasterisation process takes each largest-size patch to be tested against a primitive in turn, and sub-divides that patch and then tests the relevant smaller patches (sub-patches) within that largest-size patch, and so on, until all sub-division and testing for that largest-size patch has been completed.

Once this is done, the rasterisation process then moves on to the next first level, largest size patch, and tests that patch, and so on, until all the first level, largest size patches that the primitive is to be tested against have been tested.

Other arrangements would, of course, be possible.

In the present embodiment, each primitive to be rasterised is tested against each first level (larger size) patch of the render output that falls within (is covered by) a bounding box generated for the primitive. Other arrangements would, of course, be possible.

Once all the highest level, largest size patches of the render output have been tested against a primitive (and subdivided or discarded, as appropriate), then the rasterisation process moves on to the next primitive for the render output being generated and so on, until all the primitives for the render output in question have been rasterised.

The process then moves on to the next render output (e.g. tile) to be generated once all the primitives for the render output in question have been rasterised, and so on.

The rasteriser 10 is configured in the present embodiment as a pipeline that can contain and process plural patches at the same time. The rasteriser 10 is also configured to be able to generate plural fragments at a time (simultaneously) (e.g. where a primitive is found to completely cover a patch of the render output that encompasses plural fragments (e.g. plural sampling points or sets of sampling points)). The fragments are still processed individually by the fragment processing parts of the pipeline, such as the renderer (fragment shader). Having the rasteriser produce plural fragments simultaneously helps to create back pressure to thereby keep the rendering pipeline "filled up" with fragments.

Other arrangements would, of course, be possible.

As shown in FIG. 1, the rasteriser 3 also has an early "hierarchical" depth (Z) and stencil testing stage 4 associated with it. This hierarchical depth and stencil testing stage 4 performs "early" depth and stencil tests on the patches generated by the rasterisation stage 3 to see if those patches can be culled.

To do this, each patch of the render output generated by the rasterisation stage 3 is sent to the early hierarchical depth and stencil test stage 4, which then performs a Z (depth) test on the patch of the render output to see if the patch can be discarded (culled) at this stage. At the same time, an early stencil test is carried out.

If the patch being tested fails the early depth and stencil test, it is discarded (culled) from any further processing.

If the patch being tested passes the early depth and stencil test, it is returned to the rasterisation stage 3 for further subdivision into smaller patches ("sub-patches") as discussed above. Each (covered) "sub-patch" is then returned to the early depth and stencil tester 4 for testing, and so on, until the minimum patch size is reached.

In the present embodiment the early hierarchical depth tester 4 uses a depth value range for each patch it receives from the rasterisation stage 3 by taking appropriate depth samples across the patch, and compares that depth value range with a previously derived and stored depth value range associated with the sampling (fragment) positions that the patch covers, to try to determine whether the patch will be occluded by or overdraw other fragments and sampling points to be rendered (e.g. that are further on in the pipeline or that have already been rendered) or not.

The depth value ranges that are used by the early hierarchical depth and stencil testing stage 4 when performing depth and stencil tests on patches of the render output that it receives from the rasterisation stage 3 are stored in the depth and stencil buffers 5. A range of depth values (and a stencil value) is stored in the depth and stencil buffer 5 for each patch size and position that the buffer represents (essentially for each patch size and position that the rasterisation stage 3 could generate for the tile that is being processed).

The depth value range that is stored for each patch is initially set to a default value, or to an expected depth value range for the patch if that can be determined. (In some arrangements, the possible depth values that primitives for a tile may have may be known in advance. This can then be used to populate the depth buffer 5 with ranges of expected depth values for the patches in question.) The stored patch depth value ranges are then updated as patches and/or sampling points being tested by the early hierarchical depth and stencil testing stage 4, the early depth and stencil testing stage 9, and the late depth and stencil testing stage 7, pass the respective depth and stencil tests.

Other forms of depth and/or stencil testing and depth and stencil value representations could be used, if desired.

The early hierarchical depth and stencil test stage 4 is configured to operate in an appropriately conservative manner, as is known in the art.

Once the minimum patch size is reached (a patch of 2×2 fragments in this embodiment), the rasteriser 10 issues fragments that represent the patches (and thus sampling points) that pass the early hierarchical Z and stencil test stage 4 to the remainder of the graphics processing pipeline for processing.

The first part of this processing is to subject each fragment issued (output) by the rasteriser 10 to an early depth and stencil test in the early depth and stencil test stage 9. This early depth and stencil test stage 9 performs depth and stencil tests on the individual (covered) sampling positions associated with the fragments issued by the rasteriser 10 (i.e. at a per-sampling point resolution).

To do this, the early depth and stencil tester 9 uses per-sampling position depth and stencil values stored in the depth and stencil buffers 5. Thus, the depth and stencil buffers 5 store, in addition to the per-patch depth value ranges, an appropriate depth (Z) value and stencil value, respectively, for each sampling point that the buffer represents (essentially for each sampling point position of the tile that is being processed). These values are stored in the depth and stencil buffers 5 when sampling points being tested by the early depth and stencil testing stage 9 and the late depth and stencil testing stage 7 pass the respective depth and stencil tests (the stencil values can be stored/updated when the tests are failed as well).

The depth and stencil buffers 5 are configured as two distinct buffers (although they may in the same physical memory) in this embodiment, one buffer storing per-patch depth ranges, and the other storing per-sample depth values. Other arrangements would, of course, be possible.

The early depth and stencil test stage 9 is again configured to operate in an appropriately conservative manner, as is known in the art.

Fragments that pass the early depth and stencil test stage 9 (i.e. fragments having at least one associated covered sampling position that passes the early depth and stencil test stage 9) are then sent onwards to the fragment shading stage 6 (the renderer), as shown in FIG. 1.

(Fragments that fail the early depth and stencil test stage 9 are culled by the early depth and stencil test stage 9, as is known in the art.)

The fragment shading stage 6 performs the appropriate fragment processing (rendering) operations on the fragments it receives, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying blending, fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the tile buffer 5 (i.e. determines whether the fragment data for the fragments issuing from the fragment shading stage 6 should be stored in the tile buffers 8 (should replace or modify the fragment data in the tile buffer(s) of the fragments that have already been rendered)).

To do this, the late depth test stage 7 compares the depth values of (associated with) the fragments issued from the fragment shading stage 6 with the (per-sampling position) depth values stored in the depth buffer 5 for the sampling positions in question. The depth values for sampling points that pass the late depth test 7 are also written appropriately to the Z-buffer 5 to update it, as is known in the art.

This late fragment depth and stencil test stage 7 also carries out any necessary "late" alpha and/or stencil tests on the fragments.

The fragments that pass the late fragment test stage 7 are then subjected to any remaining operations necessary on the fragments, such as blending with the framebuffer, dither etc. (not shown).

Finally, the output fragment data values are written to appropriate tile buffers 8 that store, as is known in the art, an appropriate, e.g. colour, value for each sampling point that the buffers represent (in essence for each sampling point of the tile that is being processed).

Once each tile has been processed, its data is, e.g., exported from the tile buffers 8 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would, of course, be possible.

The above describes certain features of the rasterisation and rendering processes of the graphics processing system shown in FIG. 1. Further features of the operation of the graphics processing system shown in FIG. 1 in accordance with embodiments of the technology described herein will now be described.

As described above, the rasteriser 10 of the present embodiment operates to test primitives against larger patches of the render output area, and to then progressively subdivide the larger patches into smaller patches, test the smaller patches against the primitive and, if necessary, subdivide them into even smaller patches, and so on, until a minimum patch size is reached. This facilitates more efficiently discarding larger regions of the render output area that are not covered by a given primitive earlier in the rasterisation process. However, it does mean that progressively smaller patches of the render output have to be tested one after another against the edges of a primitive as the patch subdivision proceeds.

To allow for this, and to further enhance the efficiency of the rasterisation process, the rasteriser 10 of the present embodiment further operates when it is testing a given patch of the render output against a primitive to also note in state information associated with each primitive edge whether each smaller patch of the render output in the set of smaller patches of the render output encompassed by the larger patch of the render output that is being tested was found when the larger patch of the render output was tested to entirely pass the edge test for the respective edge of the primitive. In the present embodiment the edge tests are configured such that a patch will entirely pass the edge test for the respective edge of the primitive if the patch lies entirely inside the respective edge of the primitive. Other forms of edge, and edge test "pass" criteria could, of course, be used if desired.

This state information is then used when testing the smaller patches of the render output that the larger patch is subdivided into to skip the testing of any edge of the primitive that the smaller patch of the primitive was found to entirely pass the edge test (to lie entirely inside the edge in the present embodiment) when the larger patch of the render output was tested. This then removes the need to test the primitive edges (to evaluate the primitive's edge equations) against the patches at every subdivision level, thereby freeing processing resources so that the rasterisation subdivision can go faster.

To do this, in the present embodiment, the rasterisation stage 3, when it tests a primitive against a larger patch of the render output, generates state information in the form of a coverage mask for the set of smaller patches of the render output that the larger patch is to be sub-divided into, which coverage mask includes, for each smaller patch that the larger patch includes (i.e. will be divided into for the next rasterisation sub-division), an edge test state bit in respect of each edge of the primitive that has been tested.

In the present embodiment, the patch coverage mask also includes coverage data indicating whether each smaller patch is fully or partially covered by the primitive in question, in the form of 4 "fully covered" state bits (one for each "sub-patch") and 4 "partially covered" state bits (one for each "sub-patch"). The coverage mask also indicates the size of the smaller patches (the "sub-patch" size) and the x, y position of the set of smaller patches (in an embodiment in terms of its relative position within the highest level (largest size) patch of the render output that has been considered for the position in the render output of the patch in question). (This latter is stored as the patch position until the sub-patches are read out, at which point it is converted to sub-patch position.)

The state information and coverage mask can be configured and stored as desired, e.g. depending upon how many edges are to be considered, the multisampling pattern being used (e.g. whether it is 1×, 4×, 8×, 16×, etc.), etc. This state information (coverage mask) follows the pipeline flow until the late depth testing stage and blenders, where it is discarded after blending to the tile buffer.

Other arrangements would, of course, be possible.

When the rasterisation stage 3 then comes to test a smaller patch (a sub-divided patch) against a primitive), it first checks the state bits for each edge for the smaller patch of the render output in the patch coverage mask to determine if the (and which) edge tests need to be performed for the smaller patch in question (have already been passed by the smaller patch in question or not).

If the edge state bit in the patch coverage mask indicates that the patch has already been determined to pass the edge test for the edge in question (i.e. the edge state bit is set), the edge test is not performed, and instead the process moves on to the next stage, such as checking the next edge, or the next patch of the render output, etc., as appropriate. This is implemented such that skipping an edge does not cost any cycles of testing (except that the minimum cost for the primitive is a one cycle pass through even if all edges are marked as passed).

(If the edge state bit does not indicate that the patch will pass the edge test for the edge in question, the rasterisation stage 3 performs the edge test for the edge in question for the patch of the render output in the normal manner.)

Thus, the patch coverage mask is checked when the individual smaller "sub-patches" of a larger patch are to be processed by the rasteriser, to see if the edge tests can be skipped or not.

Figure 3:
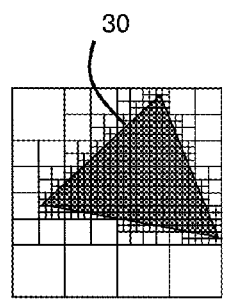
FIGS. 3 and 4 illustrate the operation of the rasterisation process in a first embodiment of the technology described herein.
Figure 4:

FIG. 4 illustrates rasterisation processing cycle savings that can be achieved for an exemplary primitive 30 shown in FIG. 3, where lower level (smaller patch) edge tests are skipped (omitted) as a consequence of recording that the testing of the primitive against a higher level, larger patch, indicates that the entire smaller patch will pass the relevant edge equation.

FIG. 4 shows progressive sub-division of the patches, and how many edge tests (checks) will be performed for each respective patch as the sub-division proceeds. (It also shows patches that will be discarded.) (It is assumed here that fully covered patches, even though not requiring any edge test, will still take one processing cycle to pass through the rasteriser logic.)

It can be seen from FIG. 4 that fully covered patches will use only one cycle to pass through the rasterisation subdivision, while partially covered patches that use the edge test pass (fully covered per edge) information when subdividing in order to skip individual edge equation tests will accordingly use as many edge evaluation tests as there are partially covered edges. FIG. 4 shows that a significant number of processing cycles can be saved by identifying when the edge test can be skipped (and then skipping those edge tests).

In the embodiment shown in FIG. 4, it is assumed that even though the edge evaluation tests can be (and are) skipped (omitted) as the subdivision of the patches proceeds, the rasteriser will still operate to fully subdivide any at least partially covered patches down to the minimum patch size so as to facilitate performing the early hierarchical depth and stencil tests on the respective smaller patches as the rasterisation process proceeds. This allows the depth values, etc., associated with a primitive being rasterised to be fully propagated to all the patches of the render output at each sub-division level that the primitive covers (i.e. for the depth and stencil buffers 5 to be appropriately updated for all the patches of the render output that the primitive covers at each sub-division level).

However, the Applicants have also recognised that where a patch is determined to be fully covered by the primitive in question and also is determined by the early hierarchical depth and stencil test 4 to pass those tests, then it would be possible to stop the subdivision and testing for such a patch at that point (as it is known at that point that the full patch needs to be rendered), i.e. at a higher hierarchical level, rather than having to perform the subdivision all the way down to the minimum patch size.

Thus, in another embodiment, the rasteriser 3, once a patch is determined to be fully covered by the primitive in question and also is determined by the early hierarchical depth and stencil test 4 to pass those tests, at that point generates and issues a set of graphics fragments for processing the patch of the render output in question, without further sub-dividing or further testing the patch of the render output. As in the present embodiment, each patch corresponds to an integer number (and array) of fragments, the number of fragments corresponding to the patch size in question will be generated.

This arrangement allows the rasterisation process to stop the rasterisation of (suitable) fully covered patches of the render output at a higher level in the rasterisation sub-division hierarchy, thereby further enhancing the efficiency of the rasterisation process.

Figure 5:
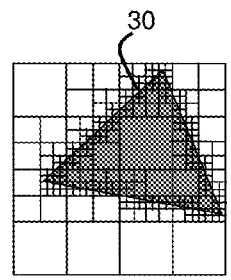
FIGS. 5 and 6 illustrate the operation of the rasterisation process in a second embodiment of the technology described herein.
Figure 6:
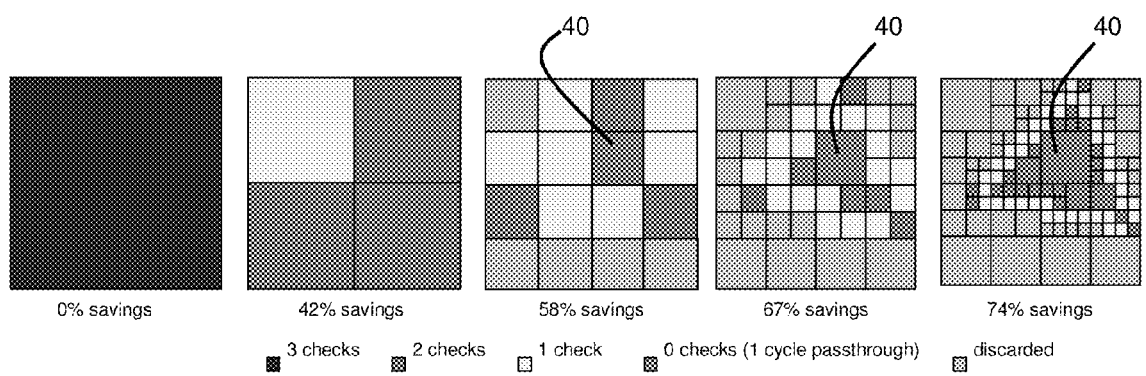

FIG. 6 illustrates this arrangement. FIG. 6 basically illustrates rasterisation of the same primitive as FIG. 4 (shown as primitive 30 in FIG. 5 for convenience), but with the additional feature that when a fully covered patch is also found to pass the depth and stencil tests, that patch is not subdivided further. Thus, as shown in FIG. 6, the fully covered patch 40, for example, once it is determined to be fully covered and to pass the depth and stencil tests, is not further subdivided, even though the subdivision still proceeds for other patches of the render output. Instead, a set of fragments corresponding to the patch 40 are generated and issued by the rasteriser 10 for rendering. As shown in FIG. 6, this further saves processing cycles for the rasterisation process.

Indeed, the Applicants have found that with this arrangement the number of cycles spent doing patch subdivision and the number of cycles spent doing sample testing can be significantly reduced for typical graphics content. (Because the cycle numbers are biased by low complexity tiles which are not rasterise bound (such tiles would give an overall performance increase of 0%), the performance in practice will not be increased by as much as the number of active cycles is reduced, but the power reduction for rasterisation will stay within these bounds.)

In this embodiment, although further sub-division and testing of a larger patch found to be completely covered by a primitive and to pass the patch depth and stencil tests is omitted, the rasteriser and rasterisation process is configured to still propagate the depth and stencil values for the larger patch down the sub-division levels (to the smaller patches that the larger patch encompasses) (to all the lower level (smaller) patches of the render output that are within the patch that is fully covered and that passed the depth and stencil tests).

In the present embodiment, the depth and stencil test values for a patch are propagated to the lower level patches by storing depth and stencil value ranges and/or values from which the depth and stencil values for the patches of the render output can be derived, and propagating the depth and stencil value ranges and/or values for a patch to the lower level patches within that patch (to the "sub-patches" within the original patch).

In particular, if a patch is fully covered, and passes the depth and stencil tests, then subdivision is stopped for that patch, and a depth value range is stored for the fully covered patch. Then, (if and) when a new primitive is tested and determined also to partially cover the patch of the render output in question, the depth value range for the previous, old primitive is propagated to (copied to) all smaller patches (sub-patches) within the original fully covered patch.

Smaller patches (sub-patches) found not to be covered at all by the new primitive then keep the old primitive's depth value range, but smaller patches (sub-patches) fully covered by the new primitive are set to the new primitive's depth value range.

Any partially covered smaller patches (sub-patches) are subdivided further using the technique of the present embodiment until the lowest subdivision level is reached. Partially covered patches, where two primitives share the patch coverage, have a depth value range encompassing both primitives associated with (stored for) them.

It can be seen from the above that the technology described herein comprises a process and rasteriser that can be speed up rasterisation, particularly for large primitives, and that can provide higher performance per area for rasterisation. The technology described herein can accordingly increase the fragment and pixel performance per area, providing, for example, a significant increase to the average pixel rate.

This is achieved, in embodiments of the technology described herein at least by using a hierarchical rasterisation process that tests primitives against progressively smaller patches of the render output, discarding any patches that are not covered by a primitive as the process proceeds, and by removing the need to evaluate the edge equations of a primitive at every subdivision level (thereby freeing processing resources so the subdivision goes faster). To do this, the rasteriser whenever it performs a patch subdivision, stores a state bit for every edge that is evaluated. This state bit indicates whether or not the entire smaller patch passed the edge equation. If the "already passed" bit is set then all subsequent subdivision of the patch in question is done without evaluating the edge in question.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of performing rasterisation in a graphics processing pipeline that includes a plurality of processing stages including a rasteriser that rasterises input primitives to generate graphics fragments to be processed, each graphics fragment is associated with one or more sampling points, and a renderer that processes fragments generated by the rasteriser to generate output fragment data, the method comprising:
   the rasteriser, upon receiving a primitive to be rasterised, for each of one or more first-level patches representing respective different regions of a render output to be generated:
      testing the respective first-level patch against edges of the primitive to determine if the primitive at least partially covers any second-level patch of a set of plural second-level patches of the render output that the respective first-level patch of the render output encompasses, wherein each second-level patch of the set of plural second-level patches is smaller than the respective first-level patch;
      and if the primitive does at least partially cover any second-level patch of the set of plural second-level patches of the render output that the respective first-level patch of the render output encompasses, subdividing the respective first-level patch of the render output into the set of plural second-level patches that the respective first-level patch of the render output encompasses, and for each second-level patch of the render output that the primitive does at least partially cover:
         testing the respective second-level patch of the render output against edges of the primitive to determine if the primitive at least partially covers any third-level patch of a set of plural third-level patches of the render output that the respective second-level patch of the render output encompasses, wherein each third-level patch of the set of plural third-level patches is smaller than the respective second-level patch;
   the method further comprising the rasteriser:
   generating one or more graphics fragments for rendering for patches of the render output found to be covered at least in part by the primitive, each graphics fragment is associated with one or more sampling points of the render output; and
   issuing the graphics fragments to the renderer for processing;
   and the method further comprising:
   if a smaller patch of the render output in a set of smaller patches of the render output encompassed by a larger patch of the render output that the larger patch of the render output is to be subdivided into is found when the larger patch of the render output is tested to entirely pass an edge test for an edge of the primitive, noting in state information associated with the edge of the primitive that the smaller patch of the render output has been found to entirely pass the edge test for the edge of the primitive, and using that state information when testing the smaller patch of the render output that was found when tested to entirely pass the edge test for the edge of the primitive against the primitive to skip the edge test of the edge of the primitive against the smaller patch of the render output.

2. The method of claim 1, wherein the larger patch encompasses a set of four smaller patches.

3. The method of claim 1, comprising subdividing and edge testing any patch found to be at least partially covered by the primitive until a selected minimum patch size is reached.

4. The method of claim 1, comprising:
if the larger patch of the render output is found when tested to entirely pass the edge test for all edges of the primitive, generating one or more graphics fragments for rendering the larger patch of the render output found to entirely pass the edge test for all edges of the primitive without edge testing or subdividing the larger patch further.

5. The method of claim 1, comprising:
the rasteriser, when testing the primitive against the larger patch of the render output, generating a coverage mask for the set of smaller patches of the render output that the larger patch is to be subdivided into, which coverage mask includes, for each smaller patch of the set of smaller patches of the render output that the larger patch will be subdivided into for the next rasterisation subdivision, an edge test state bit in respect of each edge that has been tested.

6. The method of claim 1, wherein the state information also includes coverage data indicating which smaller patches in the set of smaller patches that the larger patch is to be subdivided into were found to be covered at least in part by the primitive.

7. The method of claim 1, further comprising:
when the rasteriser tests the larger patch of the render output against edges of the primitive to determine if the primitive at least partially covers any smaller patch of the set of patches of the render output that the larger patch of the render output encompasses, also:
subjecting the larger patch of the render output to a culling test to determine if any smaller patch of the set of patches of the render output that the larger patch of the render output encompasses pass the culling test; and
if the primitive completely covers a smaller patch of the set of smaller patches of the render output that the larger patch of the render output encompasses, and that smaller patch of the set of patches of the render output that the larger patch of the render output encompasses passes the culling test:
generating one or more graphics fragments for rendering the smaller patch of the render output found to be completely covered by the primitive and to pass the culling test, and issuing the graphics fragments to the renderer for processing, without further subdividing and testing the smaller patch of the render output found to be completely covered by the primitive and to pass the culling test.

8. The method of claim 1, comprising:
stopping the subdivision and testing of the larger patch of the render output for the primitive if the larger patch is determined to be fully covered and to pass each culling test that the larger patch is subjected to; and
propagating a culling test value for that larger patch to any smaller patches of the render output that are within the larger patch that is fully covered and that passed the culling test.

9. The method of claim 8, wherein the culling test value is only propagated to any smaller patches of the render output that are within the larger patch that is fully covered and that passed the culling test after a determination is made that another primitive at least partially covers the larger patch.

10. A graphics processing pipeline comprising:
a plurality of processing stages, including a rasteriser that rasterises input primitives to generate graphics fragments to be processed, each graphics fragment is associated with one or more sampling points, and a renderer that processes fragments generated by the rasteriser to generate output fragment data;
and wherein the rasteriser is configured to, upon receiving a primitive to be rasterised, for each of one or more first-level patches representing respective different regions of a render output to be generated:
test the respective first-level patch against edges of the primitive to determine if the primitive at least partially covers any second-level patch of a set of plural second-level patches of the render output that the respective first-level patch of the render output encompasses, wherein each second-level patch of the set of plural second-level patches is smaller than the respective first-level patch;
and if the primitive does at least partially cover any second-level patch of the set of plural second-level patches of the render output that the respective first-level patch of the render output encompasses, subdivide the respective first-level patch of the render output into the set of plural second-level patches that the respective first-level patch of the render output encompasses, and for each second-level patch of the render output that the primitive does at least partially cover:
test the respective second-level patch of the render output against edges of the primitive to determine if the primitive at least partially covers any third-level patch of a set of plural third-level patches of the render output that the respective second-level patch of the render output encompasses, wherein each third-level patch of the set of plural third-level patches is smaller than the respective second-level patch;
and wherein the rasteriser is further configured to:
generate one or more graphics fragments for rendering for patches of the render output found to be covered at least in part by the primitive, each graphics fragment is associated with one or more sampling points of the render output; and
issue graphics fragments to the renderer for processing;
and wherein the rasteriser is further configured to:
if a smaller patch of the render output in a set of smaller patches of the render output encompassed by a larger patch of the render output that the larger patch of the render output is to be subdivided into is found when the larger patch of the render output is tested to entirely pass an edge test for an edge of the primitive, note in state information associated with the edge of the primitive that the smaller patch of the render output has been found to entirely pass the edge test for the edge of the primitive, and use that state information when testing the smaller patch of the render output that was found when tested to entirely pass the edge test for the edge of the primitive against the primitive to skip the edge test of the edge of the primitive against the smaller patch of the render output.

11. The pipeline of claim 10, wherein the larger patch encompasses a set of four smaller patches.

12. The pipeline of claim 10, wherein the rasteriser is further configured to:
subdivide and edge test any patch found to be at least partially covered by the primitive until a selected minimum patch size is reached.

13. The pipeline of claim 10, wherein the rasteriser is further configured to:
if the larger patch of the render output is found when tested to entirely pass the edge test for all edges of the primitive, generate one or more graphics fragments for rendering the larger patch of the render output found to entirely pass the edge test for all edges of the primitive without edge testing or subdividing the larger patch further.

14. The pipeline of claim 10, wherein the rasteriser is further configured to:
when the primitive against the larger patch of the render output, generate a coverage mask for the set of smaller patches of the render output that the larger patch is to be subdivided into, which coverage mask includes, for each smaller patch of the set of smaller patches of the render output that the larger patch will be subdivided into for the next rasterisation subdivision, an edge test state bit in respect of each edge that has been tested.

15. The pipeline of claim 10, wherein the state information also includes coverage data indicating which smaller patches in the set of smaller patches that the larger patch is to be subdivided into were found to be covered at least in part by the primitive.

16. The pipeline of claim 10, wherein:
the graphics processing pipeline includes an early culling test stage that operates in conjunction with the rasteriser to, when the rasteriser tests the larger patch of the render output against edges of the primitive to determine if the primitive at least partially covers any smaller patch of the set of patches of the render output that the larger patch of the render output encompasses:
also subject the larger patch of the render output to a culling test to determine if any smaller patch of the set of smaller patches of the render output that the larger patch of the render output encompasses pass the culling test;
and the rasteriser is further configured to:
if the primitive is found to completely cover a smaller patch of the set of smaller patches of the render output that the larger patch of the render output encompasses, and that smaller patch of the set of patches of the render output that the larger patch of the render output encompasses is found to pass the culling test:
generate one or more graphics fragments for rendering the smaller patch of the render output found to be completely covered by the primitive and to pass the culling test, and issue those graphics fragments to the renderer for processing, without further subdividing and testing the smaller patch of the render output found to be completely covered by the primitive and to pass the culling test.

17. The pipeline of claim 10, wherein the rasteriser is further configured to:
stop the subdivision and testing of the larger patch of the render output for the primitive if the larger patch is determined to be fully covered and to pass each culling test that the larger patch is subjected to; and to:
propagate a culling test value for that larger patch to any smaller patches of the render output that are within the larger patch that is fully covered and that passed the culling test.

18. The pipeline of claim 17, wherein the culling test value is only propagated to any smaller patches of the render output that are within the larger patch that is full covered and that passed the culling test after a determination is made that another primitive at least partially covers the larger patch.

19. A non-transitory computer readable storage medium storing computer software code which when executing on a processor performs a method of performing rasterisation in a graphics processing pipeline that includes a plurality of processing stages including a rasteriser that rasterises input primitives to generate graphics fragments to be processed, each graphics fragment is associated with one or more sampling points, and a renderer that processes fragments generated by the rasteriser to generate output fragment data, the method comprising:
the rasteriser, upon receiving a primitive to be rasterised, for each of one or more first-level patches representing respective different regions of a render output to be generated:
testing the respective first-level patch against edges of the primitive to determine if the primitive at least partially covers any second-level patch of a set of plural second-level patches of the render output that the respective first-level patch of the render output encompasses, wherein each second-level patch of the set of plural second-level patches is smaller than the respective first-level patch;
and if the primitive does at least partially cover any second-level patch of the set of plural second-level patches of the render output that the respective first-level patch of the render output encompasses, subdividing the respective first-level patch of the render output into the set of plural second-level patches that the respective first-level patch of the render output encompasses, and for each second-level patch of the render output that the primitive does at least partially cover:
testing the respective second-level patch of the render output against edges of the primitive to determine if the primitive at least partially covers any third-level patch of a set of plural third-level patches of the render output that the respective second-level patch of the render output encompasses, wherein each third-level patch of the set of plural third-level patches is smaller than the respective second-level patch;
the method further comprising the rasteriser:
generating one or more graphics fragments for rendering for patches of the render output found to be covered at least in part by the primitive, each graphics fragment is associated with one or more sampling points of the render output; and
issuing the graphics fragments to the renderer for processing;
and the method further comprising:
if a smaller patch of the render output in a set of smaller patches of the render output encompassed by a larger patch of the render output that the larger patch of the render output is to be subdivided into is found when the larger patch of the render output is tested to entirely pass an edge test for an edge of the primitive, noting in state information associated with the edge of the primitive that the smaller patch of the render output has been found to entirely pass the edge test for the edge of the primitive, and using that state information when testing the smaller patch of the render output that was found when tested to entirely pass the edge test for the edge of the primitive against the primitive to skip the edge test of the edge of the primitive against the smaller patch of the render output.

* * * * *